(12) United States Patent
Nonaka et al.

(10) Patent No.: US 10,464,845 B2
(45) Date of Patent: Nov. 5, 2019

(54) METHOD FOR MANUFACTURING GLASS PANEL UNIT, METHOD FOR MANUFACTURING GLASS WINDOW, AND DEVICE FOR MANUFACTURING GLASS SUBSTRATE WITH SPACER

(71) Applicant: Panasonic Intellectual Property Management Co., Ltd., Osaka (JP)

(72) Inventors: Masataka Nonaka, Osaka (JP); Eiichi Uriu, Osaka (JP); Tasuku Ishibashi, Osaka (JP); Hiroyuki Abe, Osaka (JP); Haruhiko Isikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 15/556,280

(22) PCT Filed: Mar. 8, 2016

(86) PCT No.: PCT/JP2016/001250
§ 371 (c)(1),
(2) Date: Sep. 6, 2017

(87) PCT Pub. No.: WO2016/147604
PCT Pub. Date: Sep. 22, 2016

(65) Prior Publication Data
US 2018/0044235 A1 Feb. 15, 2018

(30) Foreign Application Priority Data

Mar. 13, 2015 (JP) ................................ 2015-050148

(51) Int. Cl.
*E06B 3/663* (2006.01)
*C03C 27/10* (2006.01)
(Continued)

(52) U.S. Cl.
CPC .............. *C03C 27/06* (2013.01); *C03C 27/10* (2013.01); *E06B 3/663* (2013.01); *E06B 3/6612* (2013.01);
(Continued)

(58) Field of Classification Search
CPC .. E06B 3/663; E06B 3/66304; E06B 3/66328; E06B 3/67326; E06B 3/67365;
(Continued)

(56) References Cited

U.S. PATENT DOCUMENTS 2,962,409 A * 11/1960 Ludlow ................. B21D 47/00
156/221
3,441,924 A * 4/1969 Peek ..................... E06B 3/6612
340/550

(Continued)

FOREIGN PATENT DOCUMENTS

JP     S52-069478 A    6/1977
JP     S63-501728 A    7/1988
(Continued)

OTHER PUBLICATIONS

International Search Report for International Application No. PCT/JP2016/001250, dated May 17, 2016.

(Continued)

*Primary Examiner* — Phi D A
(74) *Attorney, Agent, or Firm* — Renner, Otto, Boisselle & Sklar, LLP

(57) ABSTRACT

A first glass substrate, a die including a penetrating space, a seat member, and a punching member are set so as to be arranged in this order. Subsequently, the seat member is punched by the punching member to remove part from the seat member through the penetrating space of the die. The part removed, is placed on the first glass substrate by the punching member so as to allow the part to serve as at least one spacer. Thereafter, the second glass substrate is placed on the first glass substrate with the at least one spacer in-between to form a glass panel unit.

11 Claims, 14 Drawing Sheets

(51) Int. Cl.
   *C03C 27/06* (2006.01)
   *E06B 3/66* (2006.01)
   *E06B 3/677* (2006.01)

(52) U.S. Cl.
   CPC ........ *E06B 3/66304* (2013.01); *E06B 3/6775* (2013.01)

(58) Field of Classification Search
   CPC .......... E06B 3/56; E06B 3/62; E06B 3/62028; F24J 2/507; C03C 27/06; C03C 27/00; C03C 27/10
   See application file for complete search history.

(56) References Cited

U.S. PATENT DOCUMENTS

| | | | | |
|---|---|---|---|---|
| 4,130,452 A | * | 12/1978 | Indri | B01D 53/34 156/155 |
| 4,928,448 A | * | 5/1990 | Phillip | E06B 3/6612 52/179 |
| 5,005,557 A | | 4/1991 | Bachii | |
| 5,009,218 A | | 4/1991 | Bachii | |
| 5,270,084 A | | 12/1993 | Parker | |
| 6,105,336 A | * | 8/2000 | Katoh | E06B 3/66 52/786.13 |
| 6,185,892 B1 | * | 2/2001 | Calvanella | B44C 5/0446 428/14 |
| 6,210,763 B1 | * | 4/2001 | Katoh | E06B 3/66304 428/34 |
| 6,387,460 B1 | * | 5/2002 | Shukuri | E06B 3/6612 428/34 |
| 6,444,281 B1 | * | 9/2002 | Wang | E06B 3/6612 428/34 |
| 6,506,272 B1 | * | 1/2003 | Aggas | E06B 3/6612 156/109 |
| 6,663,923 B2 | * | 12/2003 | Futagami | C03C 27/08 428/34 |
| 6,692,600 B2 | * | 2/2004 | Veerasamy | E06B 3/6612 156/109 |
| 6,946,171 B1 | * | 9/2005 | Aggas | E06B 3/6612 428/34 |
| 7,114,306 B2 | * | 10/2006 | Minaai | C03C 27/06 52/786.13 |
| 7,305,853 B2 | * | 12/2007 | Minaai | E06B 3/6612 65/34 |
| 7,989,040 B2 | * | 8/2011 | Stark | E06B 3/6604 428/34 |
| 8,182,887 B2 | * | 5/2012 | Jones | E06B 3/6612 428/34 |
| 8,316,596 B2 | * | 11/2012 | Anderson | E06B 3/677 52/204.62 |
| 8,381,382 B2 | * | 2/2013 | Wunnicke | E06B 3/67386 156/109 |
| 8,460,493 B2 | * | 6/2013 | Cooper | E06B 3/6612 156/104 |
| 8,512,830 B2 | * | 8/2013 | Bettger | E06B 3/66304 428/34 |
| 9,587,425 B2 | * | 3/2017 | Free | B32B 37/025 |
| 10,000,407 B2 | * | 6/2018 | Tian | C03B 23/24 |
| 2013/0101759 A1 | * | 4/2013 | Jones | E06B 3/6612 428/34 |
| 2013/0202821 A1 | | 8/2013 | Son et al. | |
| 2017/0268284 A1 | * | 9/2017 | Collins | C03C 27/06 |
| 2017/0328122 A1 | * | 11/2017 | Abe | C03C 27/06 |

FOREIGN PATENT DOCUMENTS

| | | |
|---|---|---|
| JP | H07-072818 B | 8/1995 |
| JP | H10-087350 A | 4/1998 |
| JP | H10-139495 A | 5/1998 |
| JP | 11-79799 A | 3/1999 |
| JP | H11-209149 A | 8/1999 |
| JP | 2000-086307 A | 3/2000 |
| JP | 2004-352566 A | 12/2004 |
| JP | 2009-116607 A | 5/2009 |
| JP | 2013-540684 A | 11/2013 |
| WO | 2013/055536 A1 | 4/2013 |

OTHER PUBLICATIONS

Extended European Search Report for corresponding European Application No. 16764437.6 dated Dec. 15, 2017.

* cited by examiner

METHOD FOR MANUFACTURING GLASS PANEL UNIT, METHOD FOR MANUFACTURING GLASS WINDOW, AND DEVICE FOR MANUFACTURING GLASS SUBSTRATE WITH SPACER

TECHNICAL FIELD

The present invention relates to techniques for manufacturing glass panel units, and in particular to a technique for manufacturing a glass panel unit where one or more spacers sandwiched between a pair of glass substrates.

BACKGROUND ART

Patent Literature 1 discloses a glass panel unit where spacers are sandwiched between a pair of plates of glass. Patent Literature 1 discloses a manufacturing method including placing spacers which are made to have a solid cylindrical shape in advance, on a plate of glass (glass substrate) in a predetermined arrangement. Placed on the plate of glass where the spacers are placed, is another plate of glass (glass substrate), thereby a glass panel unit where the spacers are sandwiched between the pair of plates of glass being obtained.

CITATION LIST

Patent Literature

Patent Literature 1: JP H11-79799 A

SUMMARY OF INVENTION

Such conventional methods include a step of forming spacers with predetermined shapes, a step of storing the spacers formed for a time, and a step of sandwiching the spacers stored between a pair of glass substrates. There may be a problem that such an increase in the number of steps results in poor efficiency.

An object to be solved by the present invention would be to efficiently manufacture a glass panel unit where one or more spacers sandwiched between a pair of glass substrates.

A method for manufacturing glass panel unit, of one aspect according to the present invention, includes the following steps.

The method for manufacturing glass panel unit, of the above aspect according to the present invention, includes a setting step, a spacer forming step, and an assembling step.

The setting step is a step of setting a first glass substrate, a die including a penetrating space, a seat member, and a punching member so as to be arranged in this order.

The spacer forming step is a step of punching the seat member by the punching member to remove part from the seat member through the penetrating space of the die and place the part removed, on the first glass substrate by the punching member so as to allow the part to serve as at least one spacer.

The assembling step is a step of placing a second glass substrate on the first glass substrate with the at least one spacer in-between to form between the first glass substrate and the second glass substrate an inside space where the at least one spacer is present.

A method for manufacturing glass window, of one aspect according to the present invention, includes a fitting step of fitting a glass panel unit manufactured by the method for manufacturing glass panel unit of the above aspect according to the present invention, into a window frame.

A device for manufacturing glass substrate with spacer, of one aspect according to the present invention, includes the following elements.

The device for manufacturing glass substrate with spacer, of the above aspect according to the present invention, is a device for manufacturing a glass substrate with spacer which constitutes part of a glass panel unit. The device includes: a substrate support where a glass substrate is to be placed; a die including a penetrating space; and a punching member. The punching member is for punching a seat member placed on the die by way of the penetrating space. The die is positioned between the substrate support and the punching member. The punching member is to place part of the seat member removed by punching with the punching member, on the glass substrate to serve as at least one spacer.

DESCRIPTION OF EMBODIMENTS (Embodiment 1)

Figure 1:
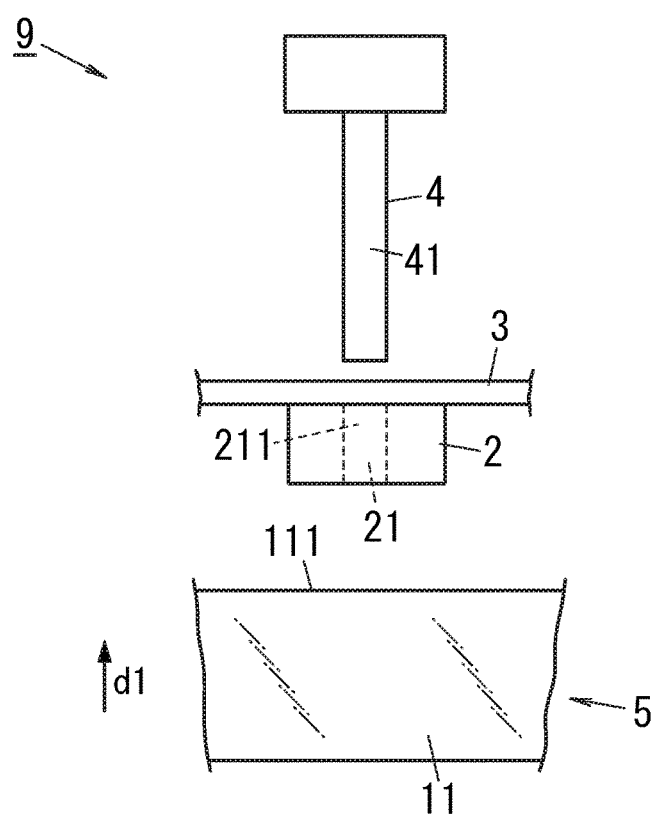
FIG. 1 is a schematic side view of a manufacturing device of Embodiment 1.
Figure 2:
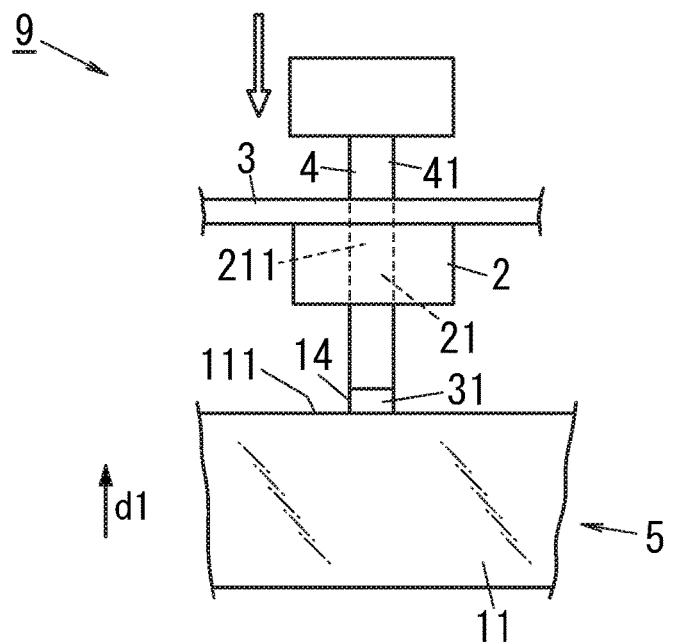
FIG. 2 is a schematic side view for illustration of punching a seat member by the manufacturing device of Embodiment 1.
Figure 3:
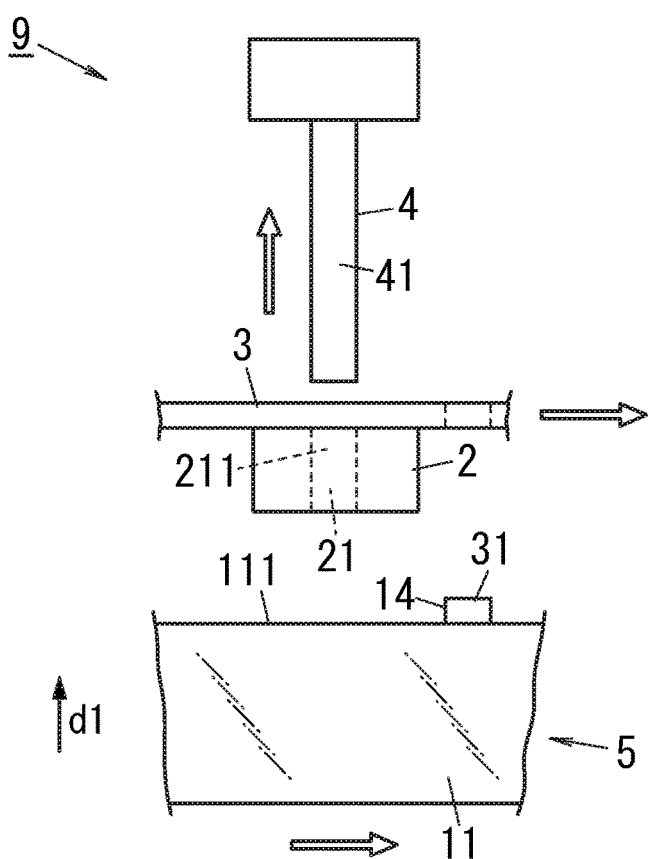
FIG. 3 is a schematic side view for illustration of moving the seat member and a glass substrate by the manufacturing device of Embodiment 1.

FIG. 1 to FIG. 3 schematically show a manufacturing device 9 of Embodiment 1. The manufacturing device 9 is a device for manufacturing a spacer-mounted glass substrate 100 (see FIG. 4).

The spacer-mounted glass substrate 100 constitutes part of a glass panel unit 1, and in more detail has a structure where a plurality of spacers 14 are placed on a main face 111 of a glass substrate 11.

Another glass substrate 12 is placed on the spacer-mounted glass substrate 100 so as to face the main face 111 of the glass substrate 11. And, outer peripheries of the glass substrates 11 and 12 facing each other are hermetically bonded to each other with a seal member 13 having a frame shape, and thereby the glass panel unit 1 (see FIG. 5) is formed.

Hereinafter, the glass substrate 11 constituting the spacer-mounted glass substrate 100 is referred to as a "first glass substrate" and is designated by the same reference sign 11. The glass substrate 12 placed on the spacer-mounted glass substrate 100 is referred to as a "second glass substrate" and is designated by the same reference sign 12.

As shown in FIG. 1 to FIG. 3, the manufacturing device 9 includes a substrate support 5, a die 2, and a punching member 4. As to FIG. 1 to FIG. 3, a direction of an arrow d1 indicates an upward direction and an opposite direction from the arrow d1 is a downward direction.

The substrate support 5 supports the first glass substrate 11 in a posture where the main face 111 points upward.

The die 2 is positioned above the substrate support 5. The die 2 is positioned above the main face 111 of the first glass substrate 11 supported on the substrate support 5.

The die 2 includes a penetrating space 21. The penetrating space 21 includes one penetrating hole 211 penetrating the die 2 in an upward and downward direction. A seat member 3 is placed on an upper face of the die 2 to cover the penetrating hole 211. Examples of material of the seat member 3 may include various types of resin and metal.

The punching member 4 is placed above the die 2. The punching member 4 includes a punch 41 with a pillar shape protruding downward. The punch 41 serves as part for punching the seat member 3 placed on the die 2 by moving downward through the penetrating hole 211.

The following description is made to methods for manufacturing the spacer-mounted glass substrate 100 with the manufacturing device 9 and manufacturing the glass panel unit 1 by use of this.

Figure 6:
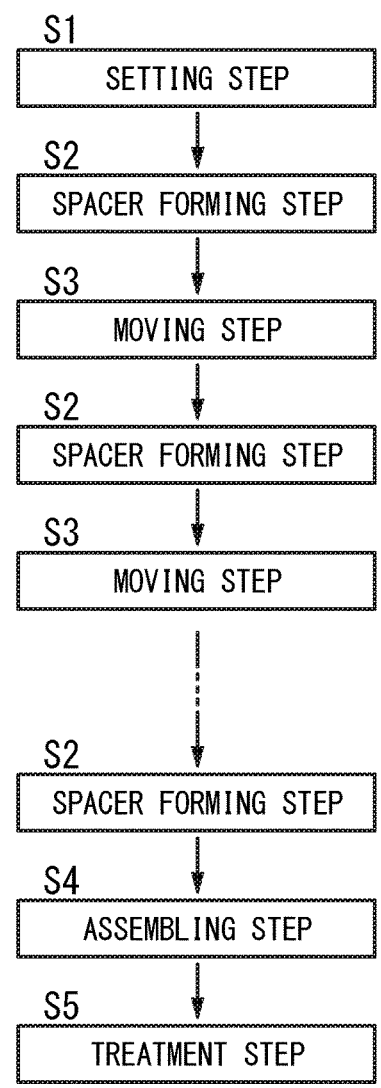
FIG. 6 is a flow chart of a manufacturing method of Embodiment 1.

A manufacturing method of the present embodiment includes a setting step S1, a spacer forming step S2, a moving step S3, an assembling step S4, and a treatment step S5. As shown in FIG. 6, in the manufacturing method of the present embodiment, the assembling step S4 and the treatment step S5 are performed after the spacer forming step S2 is repeated a plurality of times with the moving step S3 is being performed between adjacent spacer forming steps S2.

Hereinafter, individual steps are described in sequence.

<Setting Step>

The setting step S1 includes setting the first glass substrate 11, the die 2, the seat member 3, and the punching member 4 so as to be arranged in this order from a lower side to an upper side (see FIG. 1). The seat member 3 is placed on the upper face of the die 2. The punch 41 constituting the punching member 4 is positioned just above the penetrating hole 211 included in the die 2 with the seat member 3 in-between.

<Spacer Forming Step>

The spacer forming step S2 includes moving the punching member 4 downward in a straight track. By moving the punching member 4 downward, the punch 41 with a pillar shape punches the seat member 3 to remove a part 31 therefrom and carries it downward through the penetrating hole 211 of the die 2 (see an outline arrow in FIG. 2).

The part 31 separate from the seat member 3 by punching with the punch 41 is pressed against the main face 111 of the first glass substrate 11 while being in contact with a top end surface of the punch 41.

The part 31 separate from the seat member 3 is pressed against the main face 111 of the first glass substrate 11 by the top end surface of the punch 41 at a predetermined pressure for a predetermined period of time, and thereby tentatively fixed on the main face 111. The part 31 which is removed from the seat member 3 and tentatively fixed serves as the spacer 14 on the main face 111.

<Moving Step>

The moving step S3 includes, as shown in outline arrows in FIG. 3, moving the punching member 4 upward and then moving the first glass substrate 11 and the seat member 3 horizontally. In the present embodiment, the first glass substrate 11 and the seat member 3 are moved in the same moving direction, but the first glass substrate 11 and the seat member 3 may be moved in different moving direction.

In an alternative case, the first glass substrate 11 and the seat member 3 may not be moved but the punching member 4 and the die 2 may be moved instead. In an alternative case, the first glass substrate 11 and the seat member 3 may be moved and the punching member 4 and the die 2 may be moved.

In each case, the spacer forming step S2 is performed again after the moving step S3 is performed. Thereby, a part 31 is newly removed from the seat member 3 by punching, and this newly removed part 31 is tentatively fixed on the main face 111 of the first glass substrate 11. As a result, a new spacer 14 is formed.

As described above, in the manufacturing method of the present embodiment, the spacer forming step S2 is performed repeatedly a plurality of times with the moving step S3 being performed between adjacent spacer forming steps S2. Stated differently, the spacer forming step S2 is repeated a plurality of times with a change in a relative position between the punching member 4 and the first glass substrate 11. Thereby, a plurality of spacers 14 are formed on the main face 111 of the first glass substrate 11 so as to be separate from each other.

Consequently, it is possible to efficiently manufacture the spacer-mounted glass substrate 100 (see FIG. 4) including a plurality of spacers 14.

Note that, in a case where plenty of spacers are formed in advance and stored as with the conventional techniques, the spacers may adhere to each other due to static electricity depending on materials thereof. However, the aforementioned steps may prevent the spacers 14 from adhering to each other. This may lead to an increase a degree of freedom of selection of material of the spacer 14 (material of the seat member 3).

<Assembling Step>

Figure 4:
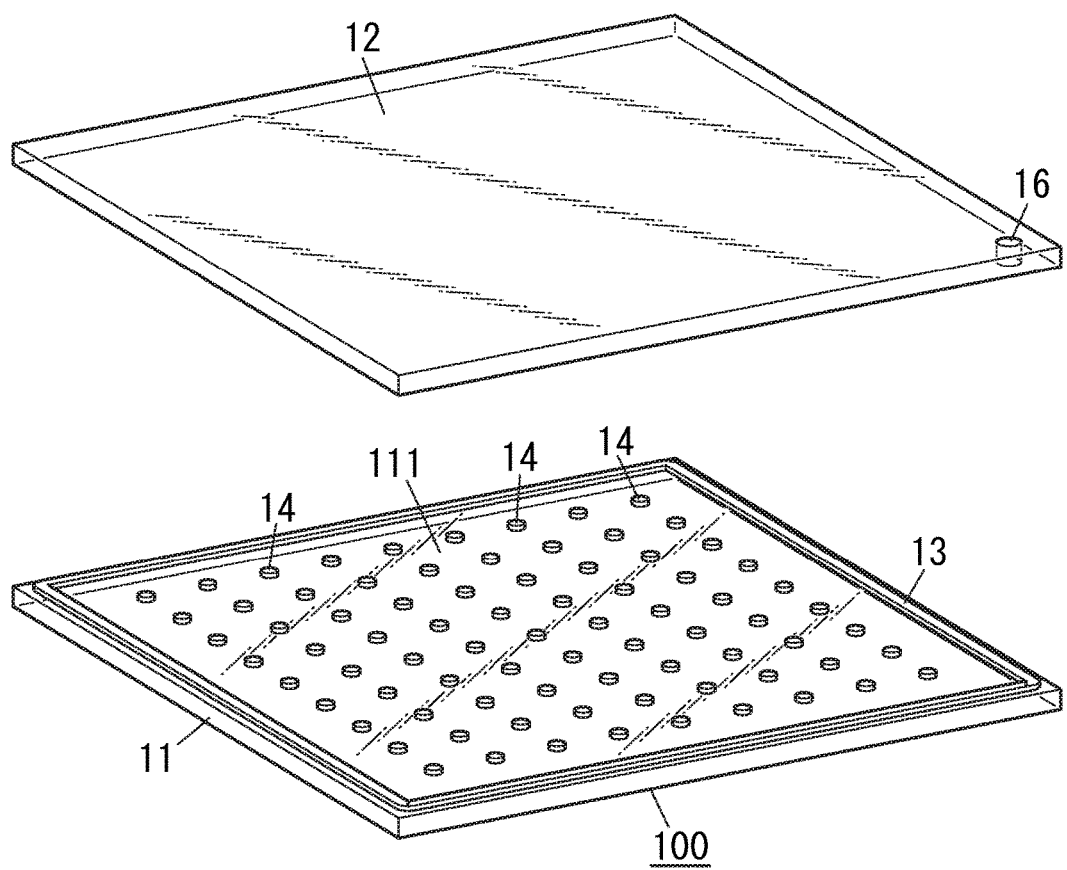
FIG. 4 is a perspective view of a spacer-mounted glass substrate manufactured by the manufacturing device of Embodiment 1 and another glass substrate bonded thereto.

The assembling step S4 includes, as shown in FIG. 4, placing the seal member 13 with a frame shape on an outer periphery of the main face 111 of the first glass substrate 11 constituting the spacer-mounted glass substrate 100. The seal member 13 is positioned on the main face 111 of the first glass substrate 11 so as to surround the plurality of spacers 14 collectively.

Further, the assembling step S4 includes placing the second glass substrate 12 on (over) the first glass substrate 11 with the plurality of spacers 14 and the seal member 13 in-between, and bonding the first glass substrate 11 and the second glass substrate 12 to each other with the seal member 13.

Figure 5:
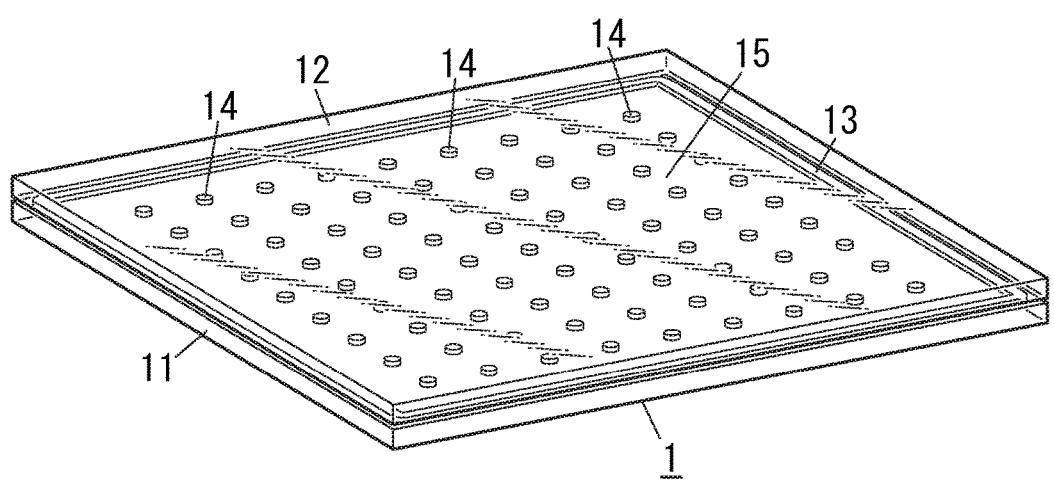
FIG. 5 is a perspective view of a glass panel unit formed by use of the spacer-mounted glass substrate manufactured by the manufacturing device of Embodiment 1.

Formed between the first glass substrate 11 and the second glass substrate 12 bonded to each other is an inside space 15 (see FIG. 5). Inside the inside space 15, the plurality of spacers 14 are present. The plurality of spacers 14 each are in contact with the second glass substrate 12 to keep a distance between the first glass substrate 11 and the second glass substrate 12.

<Treatment Step>

The treatment step S5 includes: reducing pressure of the inside space 15 until it reaches a predetermined degree of vacuum or supplying gas (such as dry air or argon) to the inside space 15, through a vent 16 (see FIG. 4) included in the second glass substrate 12; and then hermetically closing the vent 16.

By finishing the treatment step S5, the glass panel unit 1 shown in FIG. 5 is formed.

The glass panel unit 1 includes between the first glass substrate 11 and the second glass substrate 12 the inside space 15 which is hermetically enclosed while having a reduced pressure or being supplied with gas. The glass panel unit 1 has improved thermally insulating properties due to presence of this inside space 15.

Note that, the inside space 15 may not have a reduced pressure, or may not be supplied with gas. Stated differently, the glass panel unit 1 may be formed by the manufacturing method not including the treatment step S5. The glass panel unit 1 formed by the manufacturing method of this case also have thermally insulating properties.

In the present embodiment, plenty of spacers 14 are arranged at almost regular intervals between the first glass substrate 11 and the second glass substrate 12. However, the number and locations of spacers 14 may not be limited particularly. It is allowed that one spacer 14 is placed on the main face 111 of the first glass substrate 11.

(Embodiment 2)

Figure 7:
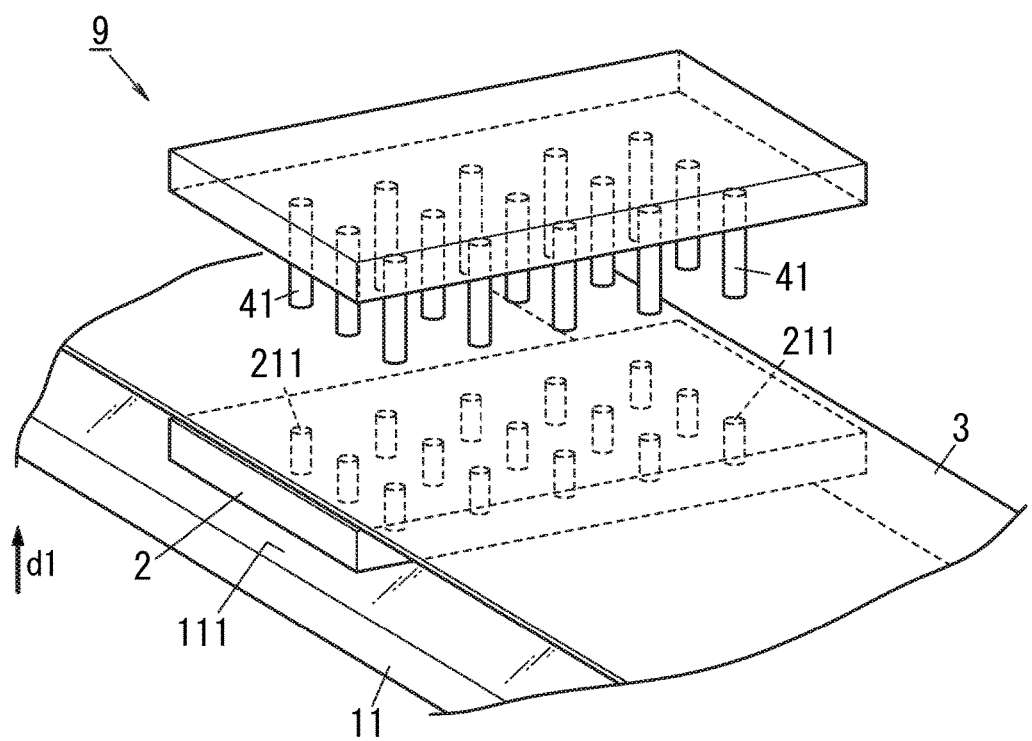
FIG. 7 is a schematic perspective view of a manufacturing device of Embodiment 2.
Figure 8:
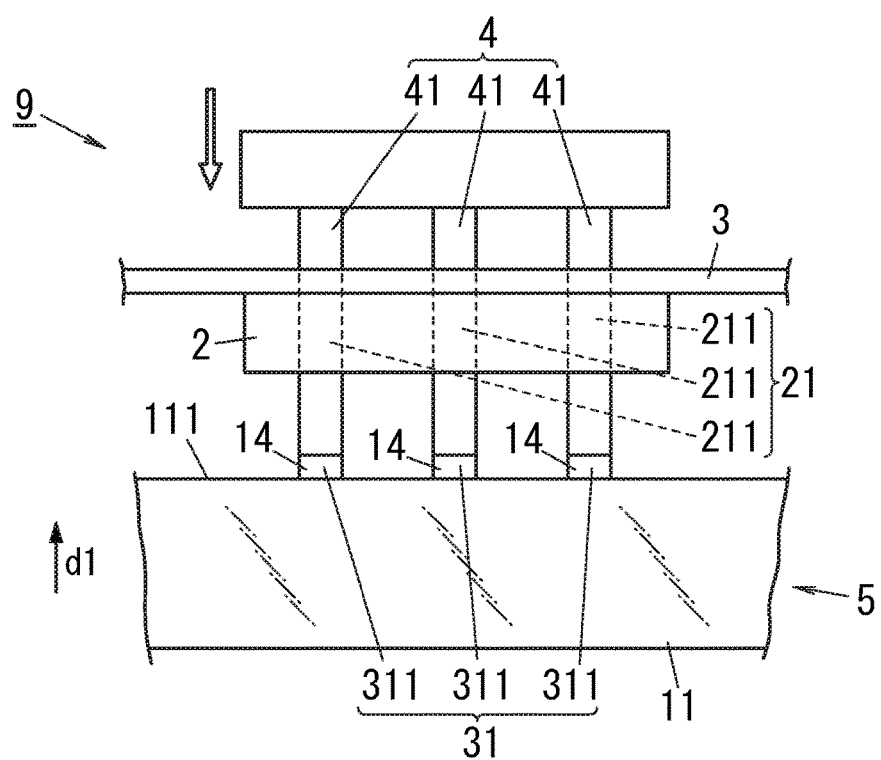
FIG. 8 is a schematic side view for illustration of punching a seat member by the manufacturing device of Embodiment 2.
Figure 9:
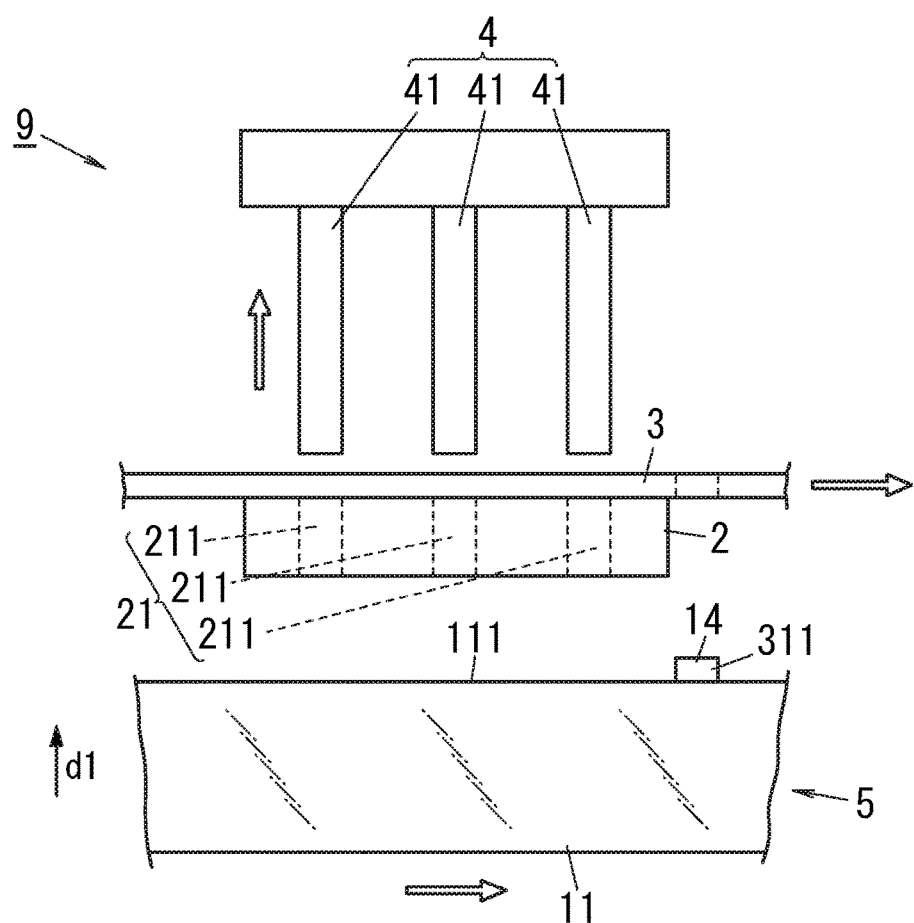
FIG. 9 is a schematic side view for illustration of moving the seat member and a glass substrate by the manufacturing device of Embodiment 2.

FIG. 7 to FIG. 9 show a manufacturing device 9 of Embodiment 2 schematically. Hereinafter, as to components of the manufacturing device 9 of the present embodiment, same components as Embodiment 1 are designated by common reference signs to avoid detailed descriptions, and different components from Embodiment 1 are described in detail.

A penetrating space 21 included in the manufacturing device 9 of the present embodiment includes a plurality of penetrating holes 211 positioned separate from each other. The plurality of penetrating holes 211 have the same dimensions and shape. The plurality of penetrating holes 211 are arranged in a matrix manner in a plan view (when viewed from the above).

Further, a punching member 4 included in the manufacturing device 9 of the present embodiment includes a plurality of punches 41 positioned separate from each other. The plurality of punches 41 have the same dimensions and shape. The plurality of punches 41 are arranged in a matrix manner in a plan view (when viewed from the above).

An arrangement pattern of the plurality of punches 41 is identical to an arrangement pattern of the plurality of penetrating holes 211. The plurality of punches 41 are allowed to individually (one by one) intrude into the plurality of penetrating holes 211 positioned below.

Hereinafter, individual steps for manufacturing a glass panel unit 1 by use of the manufacturing device 9 of the present embodiment are described. A manufacturing method of the present embodiment includes a setting step S1, a spacer forming step S2, a moving step S3, an assembling step S4, and a treatment step S5, as with the manufacturing method of Embodiment 1. Hereinafter, as for the individual steps, same steps as Embodiment 1 are not described, but different steps from Embodiment 1 are described.

<Setting Step>

The setting step S1 of the present embodiment includes setting a first glass substrate 11, a die 2, a seat member 3, and the punching member 4 so as to be arranged in this order. After the setting step S1 is finished, the plurality of penetrating holes 211 included in the die 2 are positioned to face the plurality of punches 41 included in the punching member 4 in an upward and downward direction one by one (see FIG. 7).

<Spacer Forming Step>

The spacer forming step S2 includes making the plurality of punches 41 included in the punching member 4 punch the seat member 3 collectively (see an outline arrow in FIG. 8). Thereby, a plurality of portions 311 of the seat member 3 are removed through the plurality of penetrating holes 211 of the die 2. Thus, in the present embodiment, the plurality of portions 311 removed from the seat member 3 by punching constitute the part 31 removed from the seat member 3 by punching with the punching member 4.

Immediately after punching, the plurality of portions 311 removed from the seat member 3 by the punching are placed on a main face 111 of the first glass substrate 11 by the plurality of punches 41 without any changes. The plurality of portions 311 tentatively fixed on the main face 111 each serve as a spacer 14.

<Moving Step>

The moving step S3 includes moving the punching member 4 upward and then moving the first glass substrate 11 and the seat member 3 horizontally as with Embodiment 1 (see outline arrows in FIG. 9). Also in the present embodiment, the spacer forming step S2 is performed repeatedly a plurality of times with the moving step S3 being performed between adjacent spacer forming steps S2. Consequently, a spacer-mounted glass substrate 100 including a plurality of spacers 14 is manufactured.

Note that, performing the spacer forming step S2 one time may be sufficient to manufacture the spacer-mounted glass substrate 100. In this case, the moving step S3 may be omitted.

<Assembling Step and Treatment Step>

The assembling step S4 and the treatment step S5 are same as or similar to those in Embodiment 1. By finishing the both steps S4 and S5 additionally, it is possible to obtain a glass panel unit 1 manufactured by use of the spacer-mounted glass substrate 100.

(Embodiment 3)

Figure 10:
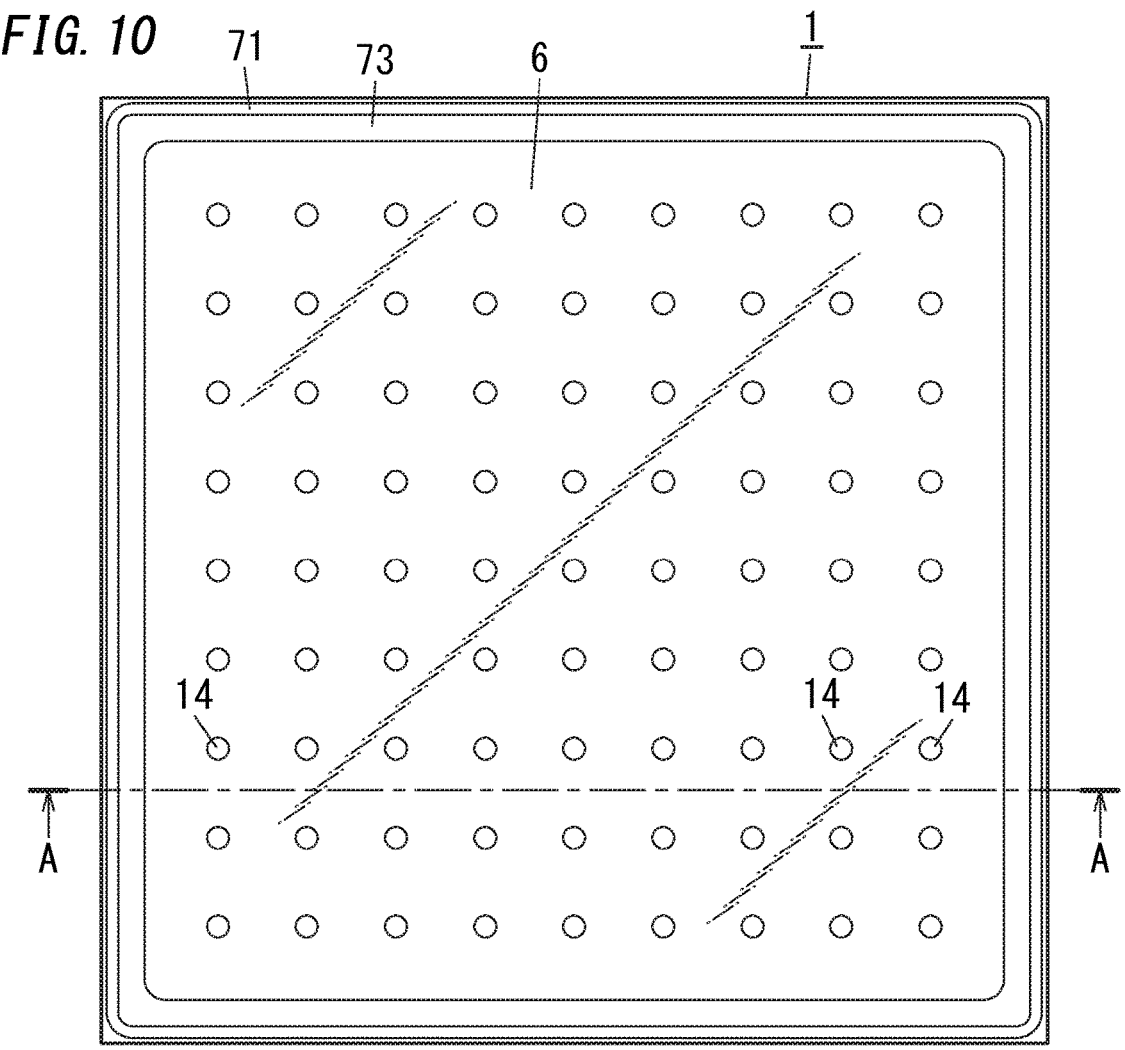
FIG. 10 is a plan of a glass panel unit manufactured by a manufacturing method of Embodiment 3.

A glass panel unit 1 of Embodiment 3 and a method for manufacturing the same are described with reference to FIG. 10, FIG. 11, and FIG. 12. Hereinafter, same components as Embodiment 1 are designated by common reference signs to avoid detailed descriptions, and different components from Embodiment 1 are described in detail.

Figure 12:
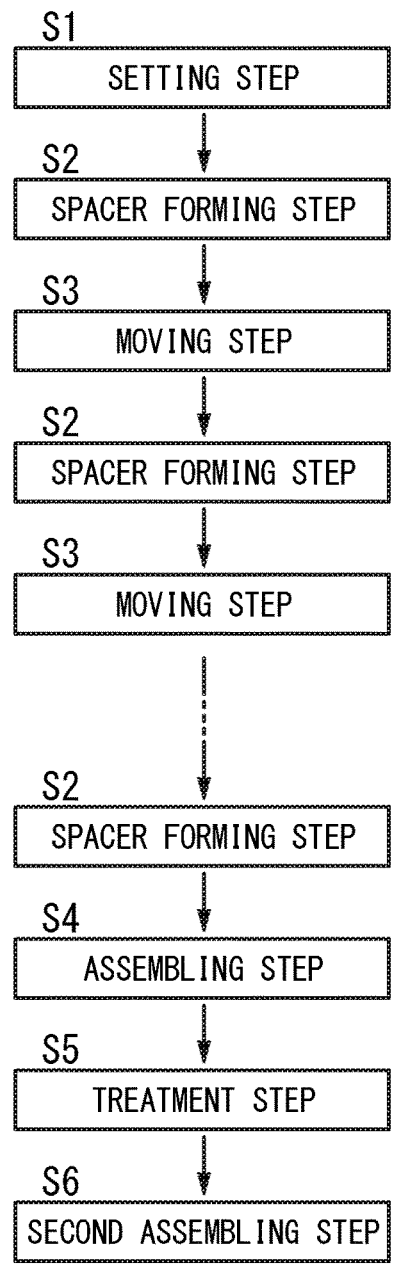
FIG. 12 is a flow chart of the manufacturing method of Embodiment 3.

As shown in FIG. 12, a manufacturing method of a glass panel unit of Embodiment 3 is a method which includes the steps of the manufacturing method of the glass panel unit of Embodiment 1 and additionally a second assembling step S6.

Figure 11:
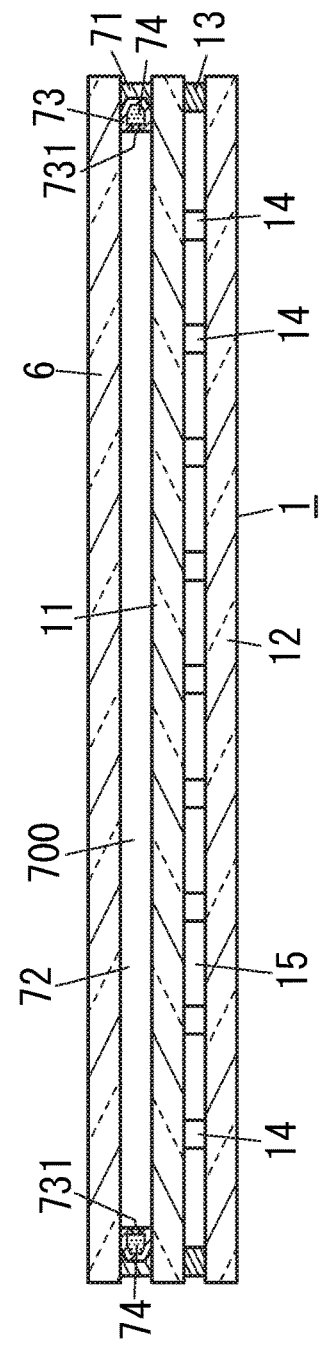
FIG. 11 is a section along line A-A in FIG. 10.

The second assembling step S6 is a step of bonding a first glass substrate 11 to a third glass substrate 6 with a seal member 71 with a frame shape to form a second inside space 72 enclosed by the seal member 71 (see FIG. 11).

There is a spacer 73 inside the seal member 71, and the spacer 73 has a frame shape with a hollow inside space. The hollow inside space of the spacer 73 is filled with desiccant 74.

The spacer 73 is made of metal such as aluminum and includes through holes 731 at its inner peripheral side. The hollow inside space of the spacer 73 is connected to the second inside space 72 through the through holes 731. Examples of the desiccant 74 may include silica gel. Examples of material for the seal member 71 may include highly airtight resin such as silicone resin and butyl rubber.

The second inside space 72 is a space hermetically enclosed by the first glass substrate 11, the third glass substrate 6, and the seal member 71. The second inside space 72 is filled with dry gas 700. Examples of the dry gas 700 may include dry rare gas such as dry argon as well as dry air. Examples of the dry air may include air which is introduced in the second inside space 72 and then dried due to action of the desiccant 74.

According to the glass panel unit 1 of Embodiment 3, the inside space 15 of which pressure is reduced until vacuum or to which gas is supplied, and the second inside space 72 filled with the dry gas 700 are interposed between the third glass substrate 6 and the first glass substrate 11 on opposite sides in the thickness direction. Thereby, thermally insulating properties can be more improved.

In the glass panel unit 1 of Embodiment 3, the first glass substrate 11 and the third glass substrate 6 are bonded to each other with the seal member 71. In an alternative case, the second glass substrate 12 and the third glass substrate 6 may be bonded to each other with the seal member 71. In this case, the second inside space 72 is formed between the second glass substrate 12 and the third glass substrate 6.

As to the glass panel unit 1 of Embodiment 3, the second inside space 72 is formed by placing the third glass substrate 6 on the glass panel unit 1 of Embodiment 1. In an alternative case, the second inside space 72 may be formed by placing the third glass substrate 6 on the glass panel unit 1 of Embodiment 2. Also in this case, the thermally insulating properties can be more improved due to presence of the second inside space 72.

(Applications)

The following descriptions are made to glass windows including the glass panel units 1 of Embodiments 1 to 3.

Figure 13:
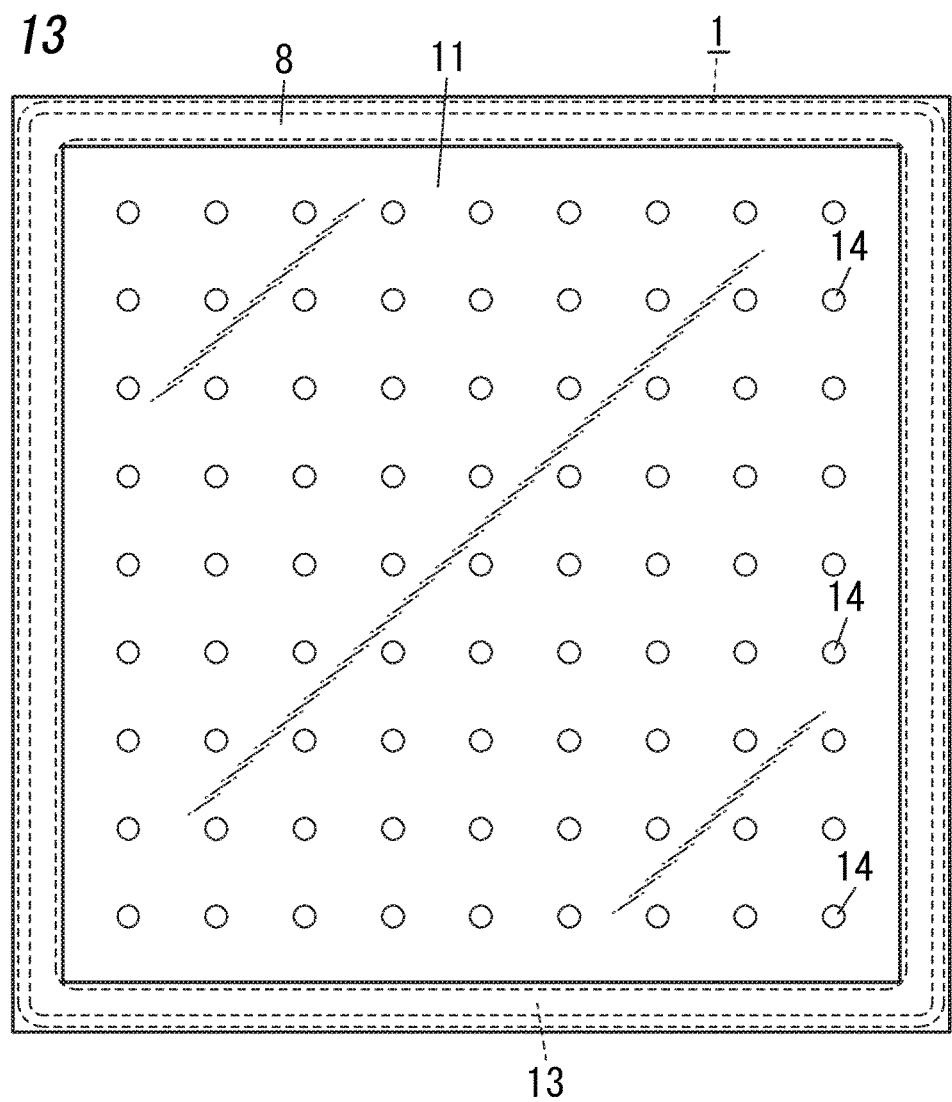
FIG. 13 is a plan of a glass window including the glass panel unit of Embodiment 1.

FIG. 13 shows a glass window including the glass panel unit 1 of Embodiment 1. This glass window has a structure where the glass panel unit 1 of Embodiment 1 is fitted into a window frame 8, and thereby has improved thermally insulating properties.

Figure 14:
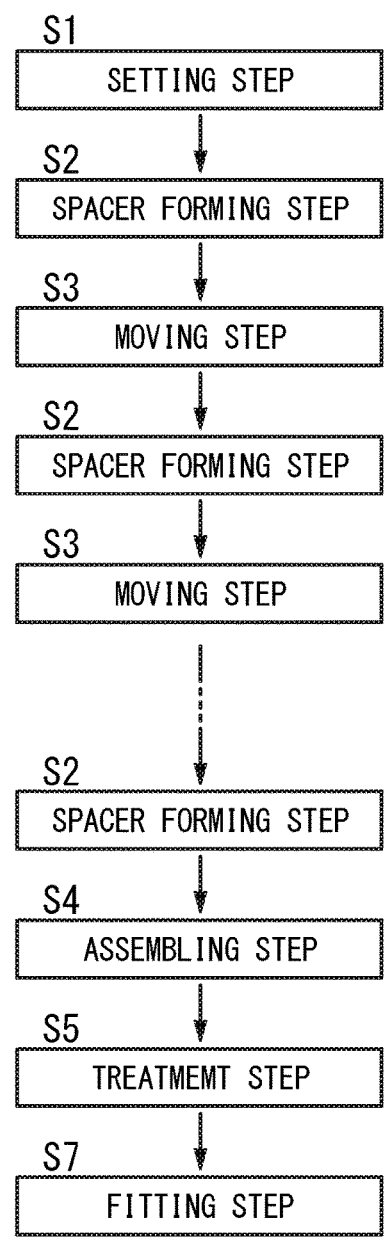
FIG. 14 is a flow chart of a manufacturing method of the glass window including the glass panel unit of Embodiment 1.

A manufacturing method of this glass window includes, as shown in FIG. 14, the steps of the manufacturing method of the glass panel unit of Embodiment 1 and additionally a fitting step S7.

The fitting step S7 is a step of fitting an outer periphery of the glass panel unit 1 manufactured through the individual steps of the manufacturing method of the glass panel unit of Embodiment 1, into the window frame 8 with a rectangular or square shape. In the treatment step S5 of Embodiment 1, air is evacuated from the inside space 15.

The glass window manufactured by this method has improved thermally insulating properties due to the inside space 15 of the glass panel unit 1 having reduced pressure.

The glass panel unit 1 of Embodiment 2 or 3 may be fitted into the window frame 8 in the fitting step S7 in a similar manner. In each case, the glass window manufactured through the fitting step S7 can have improved thermally insulating properties.

Hereinbefore, the embodiments are described. As for methods for manufacturing glass panel units, methods for manufacturing glass windows, and devices for manufacturing glass panel units, each embodiment may be modified appropriately according to design incentives, and one or more of components of the individual embodiments may be combined to apply to other embodiments.

As apparent from the aforementioned individual embodiments, a manufacturing method for glass panel unit, of the first aspect, includes the following steps.

Namely, the method for manufacturing glass panel unit, of the first aspect, includes a setting step S1, a spacer forming step S2, and an assembling step S4.

The setting step S1 is a step of setting a first glass substrate 11, a die 2 including a penetrating space 21, a seat member 3, and a punching member 4 so as to be arranged in this order.

The spacer forming step S2 is a step of punching the seat member 3 by the punching member 4 to remove part 31 from the seat member 3 through the penetrating space 21 of the die 2 and place the part 31 removed, on the first glass substrate 11 by the punching member 4 so as to allow the part 31 to serve as at least one spacer 14.

The assembling step S4 is a step of placing a second glass substrate 12 on the first glass substrate 11 with the at least one spacer 14 in-between to form between the first glass substrate 11 and the second glass substrate 12 an inside space 15 where the at least one spacer 14 is present.

As to the method for manufacturing glass panel unit of the first aspect including the above steps, removal of the part 31 from the seat member 3 by punching and placement of the part 31 on the first glass substrate 11 are performed in one sequence in the spacer forming step S2. Further, the removal of the part 31 from the seat member 3 by punching and the placement of the part 31 on the first glass substrate 11 are performed rapidly by use of the same punching member 4.

Therefore, the method for manufacturing glass panel unit of the first aspect enables efficient manufacture of the spacer-mounted glass substrate 100 where at least one spacer 14 is mounted on the first glass substrate 11, and in addition enables efficient manufacture of the glass panel unit 1 where at least one spacer 14 is sandwiched between the first glass substrate 11 and the second glass substrate 12.

The method for manufacturing glass panel unit, of the second aspect, includes the elements of the first aspect and additional elements as follows.

Namely, in the method for manufacturing glass panel unit of the second aspect, the penetrating space 21 includes a plurality of penetrating holes 211 separate from each other. The punching member 4 includes a plurality of punches 41 separate from each other.

The spacer forming step S2 includes punching the seat member 3 by the plurality of punches 41 to remove a plurality of portions 311 from the seat member 3 through the plurality of penetrating holes 211 of the die 2 and place the plurality of portions 311 removed, on the first glass substrate 11 by the plurality of punches 41, so as to allow the plurality of portions 311 to serve as a plurality of spacers 14 individually.

As to the method for manufacturing glass panel unit of the second aspect, removal of the plurality of portions 311 from the seat member 3 by punching and placement of the plurality of portions 311 on the first glass substrate 11 are performed in one sequence in the spacer forming step S2. Further, the removal of the plurality of portions 311 from the seat member 3 by punching and the placement of the plurality of portions 311 on the first glass substrate 11 are performed rapidly by use of the same punching member 4.

Therefore, the method for manufacturing glass panel unit of the second aspect enables more efficient manufacture of the spacer-mounted glass substrate 100 where a plurality of spacers 14 is mounted on the first glass substrate 11, and in addition enables more efficient manufacture of the glass panel unit 1 where a plurality of spacers 14 is sandwiched between the first glass substrate 11 and the second glass substrate 12.

The method for manufacturing glass panel unit, of the third aspect, includes the elements of the first or second aspect and additional elements as follows.

Namely, the manufacturing method for glass panel unit of the third aspect further includes a moving step S3 of changing a relative position between the punching member 4 and the first glass substrate 11. The assembling step S4 is performed after the spacer forming step S2 is repeated a plurality of times with the moving step S3 being performed between adjacent spacer forming steps S2.

According to the method for manufacturing glass panel unit of the third aspect, removal of the part 31 from the seat member 3 by punching and placement of the part 31 on the first glass substrate 11 are performed in one sequence a plurality of times, with change in the relative position between the punching member 4 and the first glass substrate 11 being performed before a next sequence.

Therefore, the method for manufacturing glass panel unit of the third aspect enables more efficient manufacture of the spacer-mounted glass substrate 100 where a plurality of spacers 14 is mounted on the first glass substrate 11, and in addition enables more efficient manufacture of the glass panel unit 1 where a plurality of spacers 14 is sandwiched between the first glass substrate 11 and the second glass substrate 12.

The method for manufacturing glass panel unit, of the fourth aspect, includes the elements of any one of the first to third aspects and additional elements as follows.

Namely, the manufacturing method for glass panel unit of the fourth aspect further includes a treatment step S5 of reducing pressure of the inside space 15 or supplying gas to the inside space 15.

Therefore, the method for manufacturing glass panel unit of the fourth aspect enables efficient manufacture of the glass panel unit 1 including the inside space 15 with improved thermally insulating properties between the first glass substrate 11 and the second glass substrate 12.

The method for manufacturing glass panel unit, of the fifth aspect, includes the elements of any one of the first to fourth aspects and additional elements as follows.

Namely, the manufacturing method for glass panel unit of the fifth aspect further includes a second assembling step S6 of bonding one of the first glass substrate 11 and the second glass substrate 12, to a third glass substrate 6 with a seal member 71 with a frame shape to form a second inside space 72 enclosed by the seal member 71.

Therefore, the method for manufacturing glass panel unit of the fifth aspect enables production of the glass panel unit 1 with improved thermally insulating properties due to presence of the second inside space 72.

A method for manufacturing glass window, of the first aspect, includes a fitting step S7 of fitting a glass panel unit 1 manufactured by the method for manufacturing glass panel unit according to any one of the first to fifth aspects, into a window frame 8.

Therefore, the method for manufacturing enables efficient manufacture of a glass window with improved thermally insulating properties.

The manufacturing device 9 for spacer-mounted glass substrate, of the first aspect, is a device for manufacturing the spacer-mounted glass substrate 100 constituting part of the glass panel unit 1, and includes the following elements.

Namely, the manufacturing device 9 of the first aspect includes: a substrate support 5 where a glass substrate (a first glass substrate) 11 is to be placed; a die 2 including a penetrating space 21; and a punching member 4 for punching a seat member 3 placed on the die 2 by way of the penetrating space 21.

The die 2 is positioned between the substrate support 5 and the punching member 4. The punching member 4 is to place part 31 of the seat member 3 removed by punching with the punching member 4, on the glass substrate 11 to serve as at least one spacer 14.

Accordingly, by use of the manufacturing device 9 of the first aspect, removal of the part 31 from the seat member 3 by punching and placement of the part 31 on the glass substrate 11 are performed in one sequence. Further, the removal of the part 31 from the seat member 3 by punching and the placement of the part 31 on the glass substrate 11 are performed rapidly by use of the same punching member 4.

Therefore, the manufacturing device 9 of the first aspect enables efficient manufacture of the spacer-mounted glass substrate 100 where at least one spacer 14 is mounted on the glass substrate 11, and in addition enables efficient manufacture of the glass panel unit 1 where at least one spacer 14 is sandwiched between the glass substrates 11 and 12.

The manufacturing device 9 for the spacer-mounted glass substrate, of the second aspect, includes the elements of the first aspect and additional elements as follows.

Namely, in the manufacturing device 9 of the second aspect, the penetrating space 21 includes a plurality of penetrating holes 211 separate from each other. The punching member 4 includes a plurality of punches 41 to intrude into the plurality of penetrating holes 211. The plurality of punches 41 are to place a plurality of portions 311 of the seat member 3 removed by punching with the plurality of punches 41, on the glass substrate 11.

By using the manufacturing device 9 of the second aspect, removal of the plurality of portions 311 from the seat member 3 by punching and placement of the plurality of portions 311 on the glass substrate 11 are performed in one sequence in the spacer forming step S2. Further, the removal of the plurality of portions 311 from the seat member 3 by punching and the placement of the plurality of portions 311 on the glass substrate 11 are performed rapidly by use of the same punching member 4.

Therefore, the manufacturing device 9 of the second aspect enables more efficient manufacture of the spacer-mounted glass substrate 100 where a plurality of spacers 14 is mounted on the glass substrate 11, and in addition enables more efficient manufacture of the glass panel unit 1 where a plurality of spacers 14 is sandwiched between the glass substrates 11 and 12.

REFERENCE SIGNS LIST

1 Glass Panel Unit
11 Glass Substrate (First Glass Substrate)
111 Main Face
12 Glass Substrate (Second Glass Substrate)
13 Seal Member
14 Spacer
15 Inside Space
100 Spacer-mounted Glass Substrate
2 Die
21 Penetrating Space
211 Penetrating Hole
3 Seat Member
31 Part 311 Portion
4 Punching Member
41 Punch
5 Substrate Support
9 Manufacturing Device
S1 Setting Step
S2 Spacer Forming Step
S3 Moving Step
S4 Assembling Step
S5 Treatment Step

The invention claimed is:

1. A method for manufacturing glass panel unit, comprising:
   a setting step of setting a first glass substrate, a die including a penetrating space, a seat member, and a punching member so as to be arranged in this order;
   a spacer forming step of punching the seat member by the punching member to remove part from the seat member through the penetrating space of the die and place the part removed, on the first glass substrate by the punching member so as to allow the part to serve as at least one spacer;
   a moving step of changing a relative position between the punching member and the first glass substrate; and
   an assembling step of placing a second glass substrate on the first glass substrate with the at least one spacer in-between to form between the first glass substrate and the second glass substrate an inside space where the at least one spacer is present,
   wherein the assembling step is performed after the spacer forming step is repeated a plurality of times with the moving step being performed between adjacent spacer forming steps, and
   wherein the spacer forming step includes pressing the part separate from the seat member against the main face of the first glass substrate by the top end surface of the punching member at a predetemined pressure for a predetermined period of time, and thereby tentatively fixed on the main face.

2. The method for manufacturing glass panel unit, according to claim 1, wherein:
   the penetrating space includes a plurality of penetrating holes separate from each other;
   the punching member includes a plurality of punches separate from each other; and
   the spacer forming step includes punching the seat member by the plurality of punches to remove a plurality of portions from the seat member through the plurality of penetrating holes of the die and place the plurality of portions removed, on the first glass substrate by the plurality of punches, so as to allow the plurality of portions to serve as a plurality of spacers individually.

3. The method for manufacturing glass panel unit, according to claim 1, further comprising a treatment step of reducing pressure of the inside space or supplying gas to the inside space.

4. The method for manufacturing glass panel unit, according to claim 1, further comprising a second assembling step of bonding one of the first glass substrate and the second glass substrate, to a third glass substrate with a seal member with a frame shape to form a second inside space enclosed by the seal member.

5. A method for manufacturing glass window, comprising a fitting step of fitting a glass panel unit manufactured by the method for manufacturing glass panel unit according to claim 1, into a window frame.

6. A method for manufacturing a glass panel unit, comprising:
   a setting step of setting a first glass substrate, a die including a penetrating space, a seat member, and a punching member so as to be arranged in this order;
   a spacer forming step of punching the seat member by the punching member to remove part from the seat member through the penetrating space of the die and place the part removed, on the first glass substrate by the punching member so as to allow the part to serve as at least one spacer;
   a moving step of changing a relative position between the punching member and the first glass substrate; and
   an assembling step of placing a second glass substrate on the first glass substrate with the at least one spacer in-between to form between the first glass substrate and the second glass substrate an inside space where the at least one spacer is present,
   wherein the assembling step is performed after the spacer forming step is repeated a plurality of times with the moving step being performed between adjacent spacer forming steps, and
   wherein the assembling step includes placing a seal member with a frame shape on an outer periphery of the main face of the first glass substrate so as to surround a plurality of spacers collectively, and bonding the first glass substrate and the second glass substrate to each other with the seal member.

7. The method for manufacturing a glass panel unit, according to claim 6, wherein:
   the spacer forming step includes pressing the part separate from the seat member against the main face of the first glass substrate by the top end surface of the punching member at a predetermined pressure for a predetermined period of time, and thereby tentatively fixed on the main face.

8. The method for manufacturing glass panel unit, according to claim 6, wherein:
   the penetrating space includes a plurality of penetrating holes separate from each other;
   the punching member includes a plurality of punches separate from each other; and
   the spacer forming step includes punching the seat member by the plurality of punches to remove a plurality of portions from the seat member through the plurality of penetrating holes of the die and place the plurality of portions removed, on the first glass substrate by the plurality of punches, so as to allow the plurality of portions to serve as a plurality of spacers individually.

9. The method for manufacturing glass panel unit, according to claim 6, further comprising a treatment step of reducing pressure of the inside space or supplying gas to the inside space.

10. The method for manufacturing glass panel unit, according to claim 6, further comprising a second assembling step of bonding one of the first glass substrate and the second glass substrate, to a third glass substrate with a seal member with a frame shape to form a second inside space enclosed by the seal member.

11. A method for manufacturing glass window, comprising a fitting step of fitting a glass panel unit manufactured by the method for manufacturing glass panel unit according to claim 6, into a window frame.

* * * * *